US005640644A

United States Patent [19]

Kimura et al.

[11] Patent Number: 5,640,644

[45] Date of Patent: Jun. 17, 1997

[54] IMAGE FORMING APPARATUS HAVING TONER REPLENISHMENT DEVICE

[75] Inventors: Kiyoshi Kimura; Fumiaki Hiraike, both of Hachioji, Japan

[73] Assignee: Konica Corporation, Tokyo, Japan

[21] Appl. No.: 464,119

[22] Filed: Jun. 5, 1995

[30] Foreign Application Priority Data

Jun. 7, 1994 [JP] Japan .................................... 6-125355
Jul. 11, 1994 [JP] Japan .................................... 6-158736

[51] Int. Cl.[6] .................................................... C03G 15/08

[52] U.S. Cl. ............................ 399/27; 399/224; 399/262

[58] Field of Search .................................... 355/203, 206, 355/245, 326 R, 246, 260; 399/27, 224, 262

[56] References Cited

U.S. PATENT DOCUMENTS 5,150,162 9/1992 Saito ....................................... 355/260

FOREIGN PATENT DOCUMENTS 4-66982 3/1992 Japan .................................... 355/203

*Primary Examiner*—Joan H. Pendegrass
*Attorney, Agent, or Firm*—Frishauf, Holtz, Goodman, Langer & Chick

[57] ABSTRACT

An image forming apparatus includes a toner replenishment device which replenishes a specified monocolor toner to a developing unit arranged around a surface of an image carrier, and which is connected to the developing unit. The apparatus further includes a toner amount detector provided in the toner replenishment device, a cover member provided on a toner replenishment opening portion formed in the toner replenishment device in such a manner that the cover member can be opened and closed, and a cover opening mechanism for enabling the cover member to be opened when the detector detects that the level of toner stored in the toner replenishment device is lower than a predetermined value.

13 Claims, 12 Drawing Sheets

IMAGE FORMING APPARATUS HAVING TONER REPLENISHMENT DEVICE

BACKGROUND OF THE INVENTION

The present invention relates to an image forming apparatus in which a toner replenishment device, which can automatically replenish toner supplied from a toner replenishment container (hereinafter called toner cartridge) to a developing unit, is provided.

In a color image forming apparatus, a plurality of developing units, in which four color toners of yellow, magenta, cyan and black, are respectively accommodated, are used. Accordingly, exclusive use toner replenishment devices are respectively provided to respective developing units. When the amount of toner remaining in the toner replenishment device is decreased, or image density is reduced, this condition is detected by a detecting means. Predetermined color toner is supplied from the corresponding toner cartridge to the toner replenishment device in which the amount of toner has been decreased.

This toner supply to the toner replenishment device is carried out as follows. The amount of toner remaining in the toner replenishment device is detected. According to the detection signal, the toner cartridge, in which corresponding color toner is accommodated, is attached to the toner replenishment device. Toner is fed into the toner replenishment device for replenishment. At this time, the toner cartridge is structured such that it can be attached to only the corresponding toner replenishment device, preventing erroneous attachment to other color toner replenishment devices.

In the present invention, as described above, a structure in which only the corresponding toner cartridge is attached to the toner replenishment device, in which toner replenishment is needed, is provided to the toner replenishment device in which four color toners are respectively accommodated. As the above-described safety means, a means is provided in which a toner cartridge, on a portion of which the same color of cyan, for example, is provided, is made for a cyan toner replenishment device so that a different color toner can not be supplied. Further, as described above, a mechanism is provided, by which only the cyan color toner cartridge, for example, can be attached to the cyan toner replenishment device. Although the above-described safety means is provided, the cyan toner cartridge, for example, can be attached to the cyan toner replenishment device even when toner is not insufficient in the toner replenishment device. Accordingly, in the case where another new toner cartridge is attached to the toner replenishment device and toner is replenished, toner is unusually excessively replenished. Then, when the toner cartridge is detached from the toner replenishment device, toner overflows from a toner supply opening, and the toner drops into the image forming apparatus. Further, a passage between the developing unit and the toner replenishment device is clogged with toner when toner is so excessively supplied, so that toner can not be properly replenished to the developing device.

SUMMARY OF THE INVENTION

The present invention has been considered in order to improve the above-described shortcomings. That is, an object of the present invention is to prevent excessive toner supply by the following means: even when toner cartridges are respectively attached to toner supply openings provided to a plurality of toner replenishment devices, cover members of the toner cartridges are prevented from opening by opening-prevention members; normally, toner replenishment from the toner cartridge is inhibited; and a means to enable the cover member to be opened only for a toner replenishment device for which toner replenishment is currently needed is provided.

The first embodiment of the present invention to attain the above-described objectives is structured as follows. An image forming apparatus, including therein a toner replenishment device which replenishes a specified monocolor toner to a developing unit arranged around the surface of an image carrier, and which is connected to the developing unit, comprises: a toner amount detection means provided in the toner replenishment device; a cover member provided on a toner replenishment opening portion formed in the toner replenishment device in such a manner that the cover member can be opened and closed; and a cover opening means for enabling the cover member to be opened when the detecting means detects that the level of toner stored in the toner replenishment device is lower than a predetermined value.

The second embodiment of the present invention is structured as follows. The, which is rotatably provided, cover member is attached to the toner replenishment device, and a replenishment container can be attached to the toner replenishment opening portion when the cover member is opened.

The third embodiment of the present invention is structured as follows. The cover member is engaged with an engagement means provided to the toner replenishment device, and when the cover member is disengaged from the engagement means, the cover member is opened, and thereby the toner replenishment opening is also opened.

The fourth embodiment of the present invention is structured as follows. The image forming apparatus comprises: an image carrier; a plurality of developing units; a plurality of toner replenishment devices for respectively replenishing toner to a plurality of developing units; a plurality of cover members respectively provided on a plurality of toner replenishment devices; a plurality of engagement means provided respectively to a plurality of toner replenishment devices; a plurality of toner amount detection means respectively provided in a plurality of toner replenishment devices; and a control means for selecting the toner replenishment device when it is detected by the toner amount detection means that the level of toner amount is reduced to a predetermined value. Further, the apparatus is structured as follows. When the engagement means of the toner replenishment device selected by the control means is released, the cover member provided on the toner replenishment opening portion of the toner replenishment device can then be opened.

The fifth embodiment of the present invention is structured as follows. The engagement means comprises a rotation member, an elevation lever and a cam member, and the cover member is engaged with and disengaged from the engagement means when the cam, a portion of an operation member, and the elevation lever are linked with each other.

The sixth embodiment is structured as follows. An image forming apparatus, including therein the toner replenishment device which replenishes specified monocolor toner to the developing unit, and which is connected to the developing unit arranged around the surface of the image carrier, comprises: the toner amount detection means provided in the toner replenishment device; a toner replenishment opening portion formed in the toner replenishment device; and the toner replenishment container having a cover member provided on the toner replenishment opening portion in such a manner that the cover member can be opened, and can also be attached to and detached from the toner replenishment opening portion. Further, the image forming apparatus is structured as follows. The cover member of the toner replenishment container can be opened only when the toner amount detection means detects that toner stored in the toner replenishment device is insufficient.

The seventh embodiment of the present invention is structured as follows. The cover member of the toner replenishment container is opened on the toner replenishment opening portion when the cover opening prevention member is released.

The eighth embodiment of the present invention is structured as follows. The opening prevention member is structured with an engagement means provided on the toner replenishment device. When engagement by the engagement means is released, the cover member is opened and toner is replenished from the toner replenishment container.

The ninth embodiment of the present invention is structured as follows. An image forming apparatus, including therein a plurality of toner replenishment devices which respectively replenish specified monocolor toner to a plurality of developing apparatus, and which are connected to a plurality of developing units arranged around the surface of the image carrier, comprises: a plurality of toner amount detection means respectively provided in a plurality of toner replenishment devices; a plurality of toner replenishment opening portions respectively formed on a plurality of toner replenishment devices; and a plurality of toner replenishment containers having respectively cover members attached to the toner replenishment opening portions in such a manner that the cover members can be opened and can be attached to and detached from the opening portions. Further, the image forming apparatus is structured as follows. The cover member of the toner replenishment container can be opened only for the toner replenishment device in which toner is insufficient when the amount of toner stored in the toner replenishment devices is detected by a plurality of toner amount detection means.

The 10th embodiment of the present invention is structured as follows. The cover member of the toner replenishment container is opened on the toner replenishment opening portion of the toner replenishment device when the opening prevention member is released.

The 11th embodiment of the present invention is structured as follows. The opening prevention means is composed of the engagement means provided on the toner replenishment device. When engagement of the engagement means is released, the cover member is opened, and toner is replenished from the toner replenishment container.

The 12th embodiment of the present invention is structured as follows. An image forming apparatus, including therein the toner replenishment device which replenishes specified monocolor toner to the developing unit, and which is connected to the developing unit arranged around the surface of the image carrier, comprises: the toner amount detection means provided in the toner replenishment device; the toner replenishment opening portion formed in the toner replenishment device; the toner replenishment container having a second cover member which can be attached to and detached from the toner replenishment opening portion and can be opened; and a first cover member provided on the toner replenishment opening portion in such a manner that the cover member can be opened and closed. Further, the image forming apparatus is structured as follows. The second cover member of the toner replenishment container, which is attached to the toner replenishment opening portion, and the first cover member provided on the toner replenishment opening portion can be simultaneously opened only when the toner amount detection means detects that the remaining toner is insufficient.

The 13th embodiment of the present invention is structured as follows. The cover member of the toner replenishment container is opened on the toner replenishment opening portion of the toner replenishment device when the opening prevention member is released.

The 14th embodiment of the present invention is structured as follows. The opening prevention member is composed of the engagement means provided on the toner replenishment device. When engagement of the engagement means is released, the first cover member is opened and toner is replenished from the toner replenishment device.

The 15th embodiment of the present invention is structured as follows. An image forming apparatus, including therein a plurality of toner replenishment devices which respectively replenish specified monocolor toner to a plurality of developing units, and which are connected to a plurality of developing units arranged around the surface of the image carrier, comprises: a plurality of toner amount detection means respectively provided in the toner replenishment devices; a plurality of toner replenishment opening portions formed on a plurality of toner replenishment devices; a plurality of toner replenishment containers having the second cover members, which can be attached to and detached from a plurality of toner replenishment opening portions, and which can be opened; and a plurality of the first cover members provided on a plurality of toner replenishment opening portions so that cover members can be opened and closed, the first cover members being prevented from opening by the opening prevention portion. Further, the image forming apparatus is structured as follows. The opening prevention member is released only for the toner replenishment device in which toner is insufficient when the amount of toner is detected by a plurality of toner amount detection means, and the second cover member, equipped on the toner replenishment opening portion, of the toner replenishment container and the first cover member, provided on the toner replenishment opening portion, can be simultaneously opened.

The 16th embodiment of the present invention is structured as follows. The image forming apparatus has a control means for selecting only a toner replenishment device, in which toner is insufficient, when the amount of toner is detected by a plurality of toner amount detection means. An engagement means of the first cover member is released only for the toner replenishment device selected by the control means so that the second cover member and the first cover member can be simultaneously opened.

The 17th embodiment of the present invention is structured as follows. The engagement means comprises a sliding member for engagement, an elevation lever, and a cam member. The cam member, the sliding member for engagement, and the elevation lever are linked with each other, and engagement and disengagement of the first cover member is caused by the engagement means.

DETAILED DESCRIPTION OF THE PREFERRED EMBODIMENT

Figure 1:
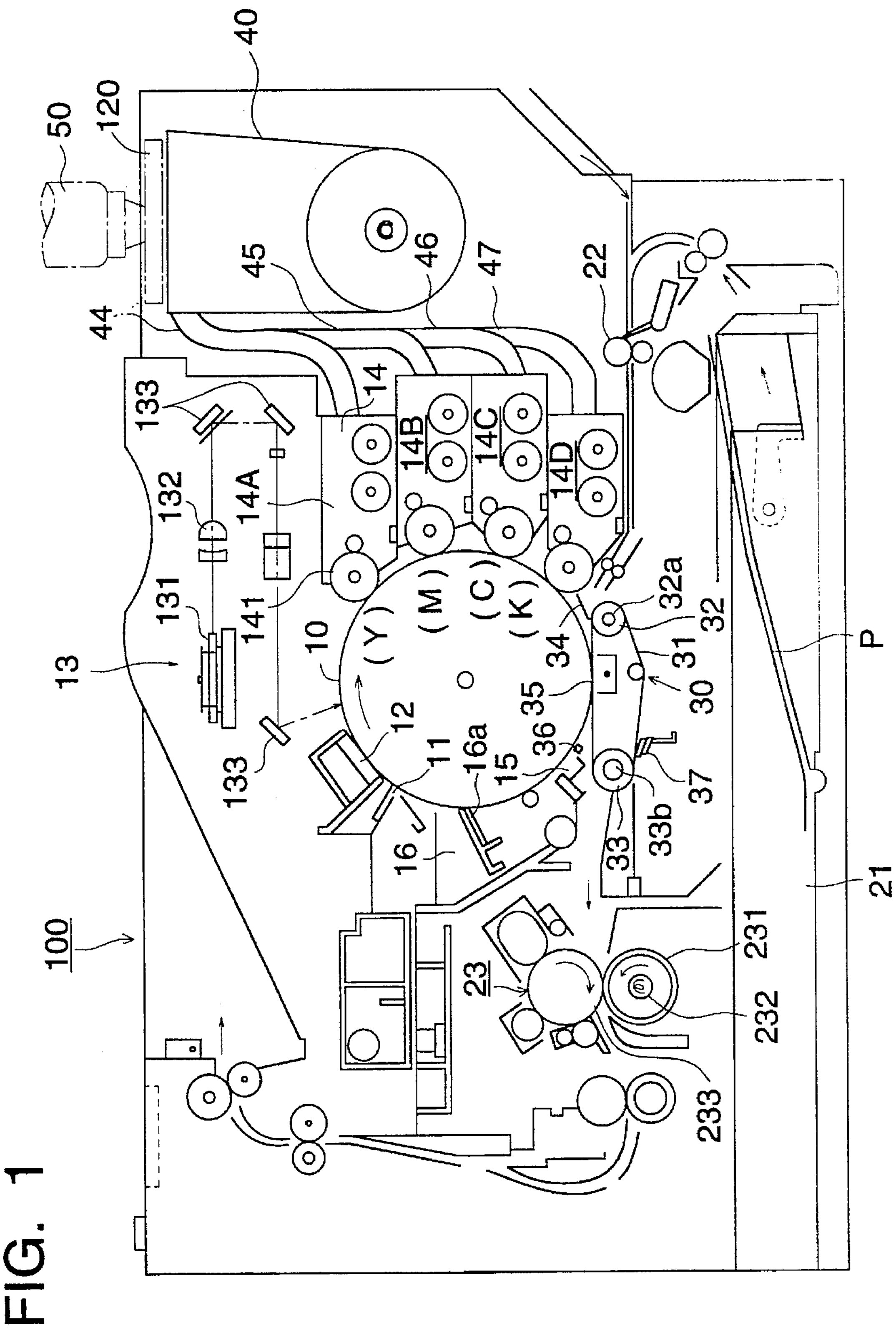
FIG. 1 is a view showing the entire structure of an image forming apparatus to which the present invention is applied.

FIG. 1 is a sectional view showing the composition of a color image forming apparatus in which a toner replenishment device of the present invention is used. Referring to the drawing, the outline of the composition and a series of operations will be described below.

A photoreceptor drum 10, which is an image carrier, and on the surface of which an OPC photoconductive layer is coated, is rotated in one direction (in the clockwise direction in the drawing), and is discharged by a discharger 11 so that any electric charge at the time of previous printing is eliminated. After that, the surface of the photoreceptor drum 10 is uniformly charged by a charger 12, and ready for new printing. After this uniform charging, image exposing is carried out by an image exposure means 13 according to an image signal. The image exposure means 13 causes a laser beam, emitted from a laser light source (which will be described later), to rotationally scan a document image using a polygonal mirror 131. The laser beam passes through an fθ lens 132 and the like, and its optical path is bent by a reflection mirror 133. The laser beam is projected onto the peripheral surface of the photoreceptor drum 10, which has been previously charged, and a latent image is formed on the surface of the photoreceptor drum 10.

Developing units 14A, 14B, 14C and 14D in which developers, made of mixed agents of toners of yellow (Y), magenta (M), cyan (C), black (K), etc. and magnetic carrier, are respectively accommodated, are respectively provided around the photoreceptor drum 10. Initially, the first color development, (for example, yellow), is carried out by a developing sleeve 141, in which a magnet is provided and which is rotated while holding the developer thereon. The thickness of the developer layer is regulated to a predetermined value on the developing sleeve 141 by a layer formation rod, and the developer is conveyed to a developing area. An AC bias voltage $V_{AC}$ is superimposed on a DC bias voltage $V_{DC}$, and these voltages are impressed upon a gap formed between the photoreceptor drum 10 and the developing sleeve 141. When the potential voltage of the exposed portion of the photoreceptor drum 10 is $V_L$, the surface potential voltage of the charged photoreceptor layer other than the exposed portion is $V_H$, and the DC bias voltage $V_{DC}$ is set so that the following relationship is satisfied, $|V_H|>|V_{DC}|>|V_L|$, then, the toner which is triggered to separate from carrier by the AC bias voltage $V_{AC}$, does not adhere to the $V_H$ portion, the potential voltage of which is higher than $V_{DC}$, and adheres to the exposed portion having the potential voltage of $V_L$, which is lower than $V_{DC}$. Thus, the latent image is visualized and developed.

Thus, after development of the first color has been completed, the development sequence enters the image formation process for the second color, (for example, magenta). The photoreceptor drum 10 is uniformly charged again, and a latent image is formed by the image exposure means 13 according to the second color image data. Regarding the third color (cyan) and the fourth color (black), the same image formation process as that of the second color is also carried out, and development of a total of four colors is carried out on the photoreceptor drum 10.

In order to supply yellow (Y), magenta (M), cyan (C) and black (K) toners to respective developing units, four toner replenishment devices 40 are provided in the apparatus. These toner replenishment devices are structured as follows. A toner replenishment tube 44 is provided to the developing unit 14A, a toner replenishment tube 45 is provided to the developing unit 14B, a toner replenishment tube 46 is provided to the developing unit 14C, and a toner replenishment tube 47 is provided to the developing unit 14D. Toner is replenished from the toner replenishment devices 40 through the respective toner replenishment tubes. Numeral 50 is toner cartridges from which toner is replenished to four toner replenishment devices 40 of yellow (Y), magenta (M), cyan (C) and black (K). A recording sheet P, which is a transfer material and is fed from a sheet feed cassette 21 by a sheet feed mechanism 22, is fed to a nip portion (transfer area) 35, which is formed between the photoreceptor drum 10 and a transfer belt 31, by a transfer belt device 30, on which the transfer belt 31 is stretched. Then, a multi-color image on the peripheral surface of the photoreceptor drum 10 is simultaneously transferred onto the recording sheet P. A high voltage is impressed upon a shaft **32*a* of an upstream side holding roller 32 of the transfer belt 31. A conductive brush 34, provided at a position opposed to the shaft 32*a*, is grounded, wherein the transfer belt 31 is sandwiched between the shaft 32*a* and the conductive brush 34. The recording sheet P fed from the sheet feed cassette enters between the brush 34 and the transfer belt 31, and then enters the transfer area while the recording sheet P is being attracted to the transfer belt 31 by the attraction force of electric charges given from the brush 34 to the recording sheet P. The recording sheet P separated from the photoreceptor drum 10 is further separated from the transfer belt 31 while it is being discharged, wherein a shaft 33*b* of a downstream side holding roller 33, around which the transfer belt 31 is stretched, is used as a counter electrode. Toner adhering to the transfer belt 31 is removed by a cleaning blade 37. Transfer belt 31 is separated from the photoreceptor drum 10 during multi-color image formation, being moved around the shaft 33*b* of the downstream side holding roller 33**.

The recording sheet P separated from the transfer belt device 30 is conveyed to a fixing unit 23, which has a heater 232 for heating inside, at least, one of thermally fixing rollers 231, and a couple of pressing rollers 233. Toner adhered onto the recording sheet P is fused when heat and pressure are applied onto the recording sheet P by the thermally fixing rollers 231 and pressing rollers 233. The toner is fixed on the recording sheet P, and after that, the recording sheet P is conveyed outside the apparatus.

After toner, which is remaining on the peripheral surface of the photoreceptor drum 10 after transfer, is discharged by the discharger 15, it arrives at the cleaning unit 16, and is scraped off into the cleaning unit 16 by the cleaning blade 16*a*, which comes into contact with the photoreceptor drum 10. Then, toner is conveyed by a screw or the like, and stored in a toner collection box. After the photoreceptor drum 10, remaining toner, which has been removed by the cleaning unit 16, has been discharged by the discharger 11, it is uniformly charged by the charger 12, and enters the next image formation cycle. There is a possibility that the cleansing blade 16*a* or an electrode wire is damaged when the recording sheet P is not separated from the transfer belt 31 and enters a portion located above the discharger 15 while being wound around the photoreceptor drum 10. Therefore, a jamming sensor 36 for detecting this winding of the recording sheet P is equipped near the discharger 15.

Figure 2:
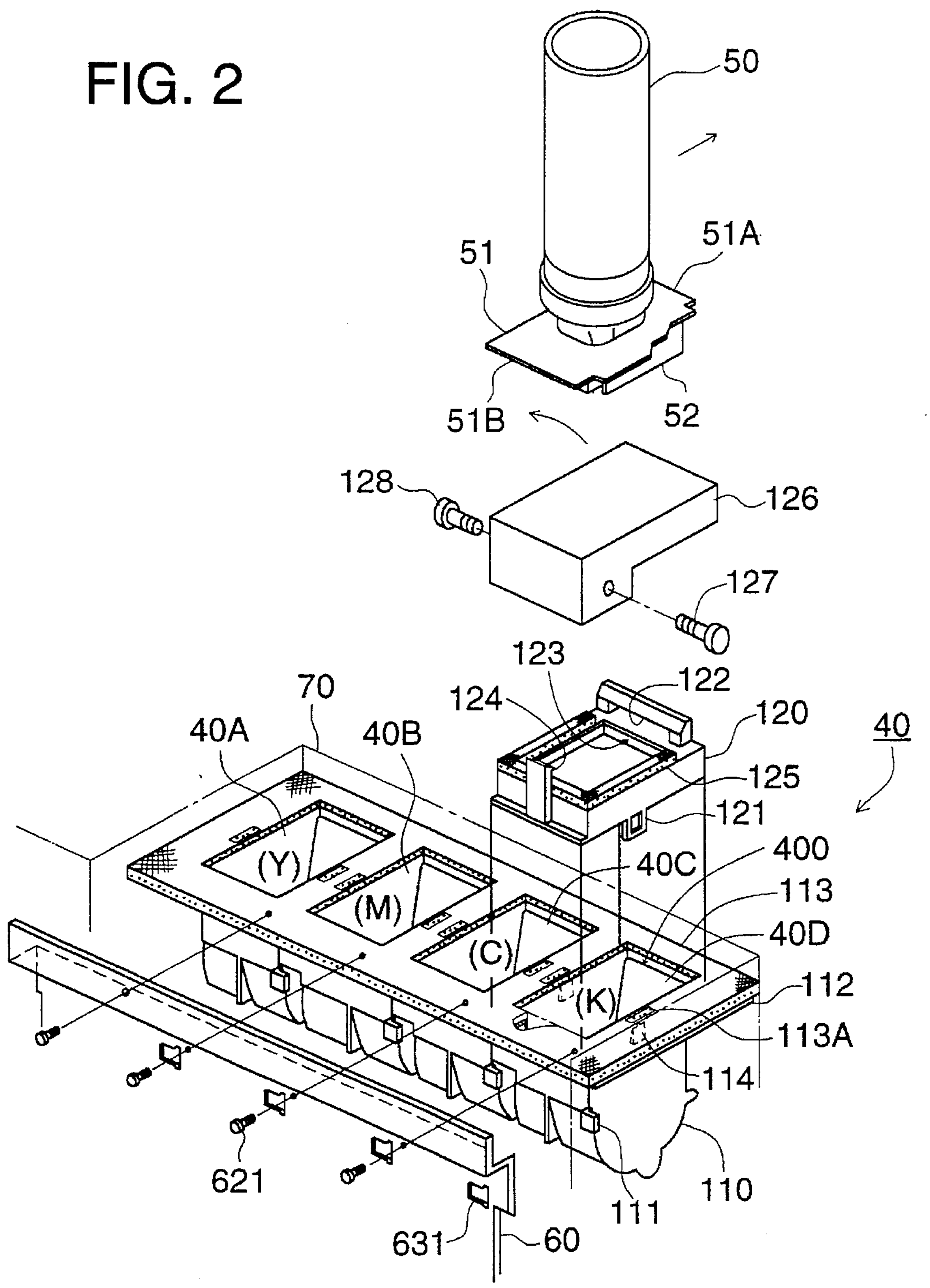
FIG. 2 is a perspective view showing the composition of the first embodiment of a toner replenishment device of the present invention.

Next, as shown in FIG. 2, the toner replenishment device 40, which replenishes toner to a plurality of developing units, according to the first embodiment of the present invention, will be described in detail below.

The toner replenishment device 40, shown in FIG. 2, is composed of: toner accommodating portions 40A, 40B, 40C and 40D in which yellow (Y), magenta (M), cyan (C) and black (K) toners are accommodated, as shown by developing units 14A, 14B, 14C and 14D; and a plurality of mounts 120 on which toner cartridges 50, disclosed in Japanese Patent Publication Open to Public Inspection 18876/1993, are attached.

The toner replenishment device 40 is fixed to and integrated with a mounting plate 60 in such a manner that a protrusion 111 provided on the side surface of a toner hopper 110, formed on the toner replenishment device 40, is engaged with a hole 631 of the mounting plate 60 supported by the apparatus main body, and the device is fixed by a screw 621.

A flange 112 is formed on the upper portion of each toner replenishment device 40, and a seal material 113 is adhered onto the flange 112. The flange 112 is integrally attached to the surface of a wall inside the apparatus and the mounting plate 60.

Figure 3:
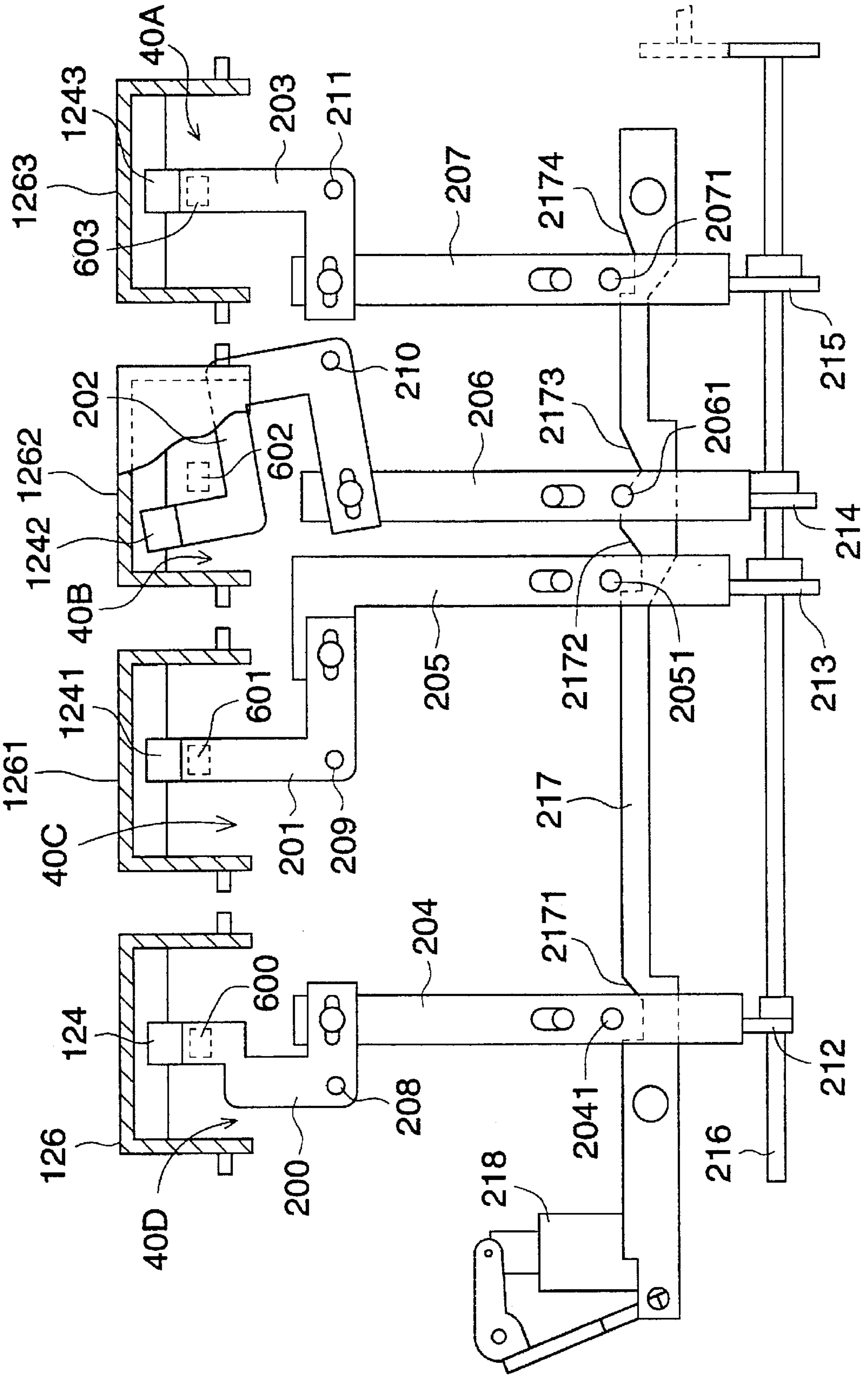
FIG. 3 is a view showing an opening prevention mechanism of a cover member in the first embodiment of the toner replenishment device of the present invention.

The seal material 113 is made of soft elastic material such as urethane form. The mounts 120 are attached to toner supply openings 400 respectively formed on the toner accommodating portions 40A, 40B, 40C and 40D in which toners are accommodated, in the toner replenishment device 40. The mounts 120 are attached by the following method. An engagement means 121 provided on the mount 120 is thrust into the seal material 113 and the flange 112 through a slit 113A, and the mount 120 is integrated with the flange 112. When the mount 120 is attached to the toner replenishment device 40, leakage of toner is prevented in such a manner that the seal material 113 is pressed and sandwiched between the mount 120 and the flange 112. A cover member 126 is attached to the mount 120 with screws 127 and 128 so that the cover member 126 can be opened and closed. As shown in FIG. 3, cover members 1261, 1262 and 1263 are respectively provided on toner accommodating portions 40A, 40B and 40C in which other toners are accommodated.

An end portion 51A of a base plate 51 provided on one end of the toner cartridge 50, and a sleeve portion 52 can be respectively engaged with an insertion portion 122 and a frame portion 123 of the mount 120. The other end portion 51B of the base plate 51 is engaged with an engagement portion 124 provided on the side of the mount 120, and the base plate 51 is supported on the mount 120 in such a manner that the end portion 51B is pressed and sandwiched between the engagement portion 124 and the mount 120 through a seal member 125. When the toner cartridge 50 is attached to the mount 120, the toner cartridge 50 is attached in such a manner that the cover member 126 is disengaged from the engagement portion 124 and opened.

FIG. 3 shows an operation mechanism of the engagement portion 124. This mechanism releases engagement of an engagement portion corresponding to any of the accommodating portions 40A, 40B, 40C and 40D for which toner replenishment is necessary, wherein yellow (Y), magenta (M), cyan (C) and black (K) toners are respectively accommodated in accommodating portions 40A, 40B, 40C and 40D. This mechanism releases engagement of the engagement portion 124 so that cover member 126 can be opened.

Engagement release mechanisms for releasing the cover members 126, 1261, 1262 and 1263 are provided as follows. Engagement portions 124, 1241, 1242 and 1243 are respectively provided on one end of each of the rotational members 200, 201, 202 and 203. The other end of each of rotational members 200, 201, 202 and 203 is connected to each of the elevation levers 204, 205, 206 and 207. The rotational members 200, 201, 202 and 203 are rotatably provided respectively on shafts 208, 209, 210 and 211 provided in the image forming apparatus 100. Cams 212, 213,214 and 215, which are respectively in contact with lower portions of the elevation levers 204, 205, 206 and 207, are fixed to a shaft 216. A moving lever 217, on which grooved cams 2171, 2172, 2173 and 2174 are formed, is provided behind the elevation levers 204, 205, 206 and 207. While the image forming apparatus 100 is operated, when the moving lever 217 is moved to the left in FIG. 3 by a solenoid 218, the elevation levers are prevented from lowering by pins 2041, 2051, 2061 and 2071 respectively provided on the elevation levers 204, 205, 206 and 207.

Figure 4:
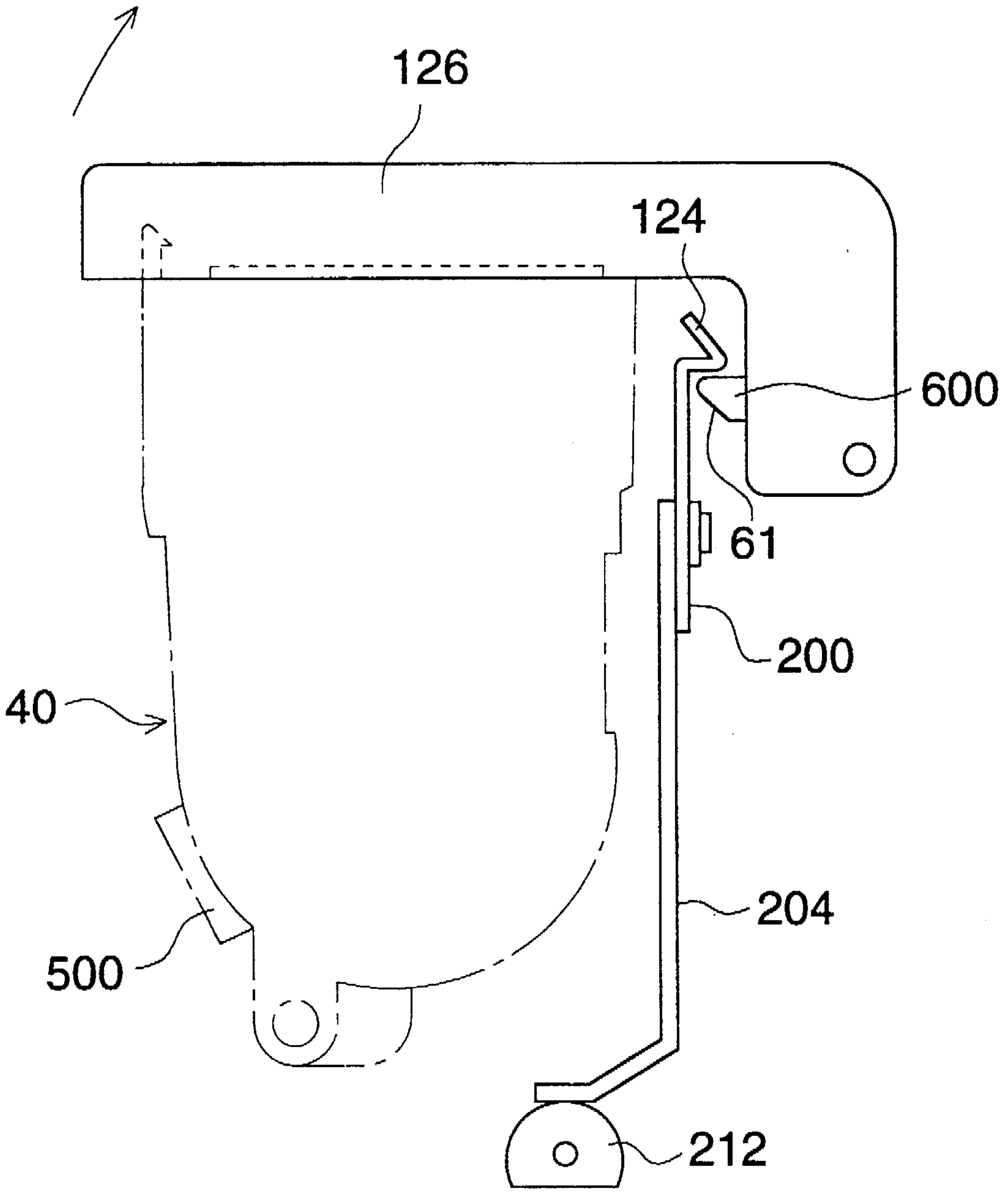
FIG. 4 is a view of the composition showing a condition in which the cover member of the first embodiment of the toner replenishment of the present invention is closed.
Figure 5:
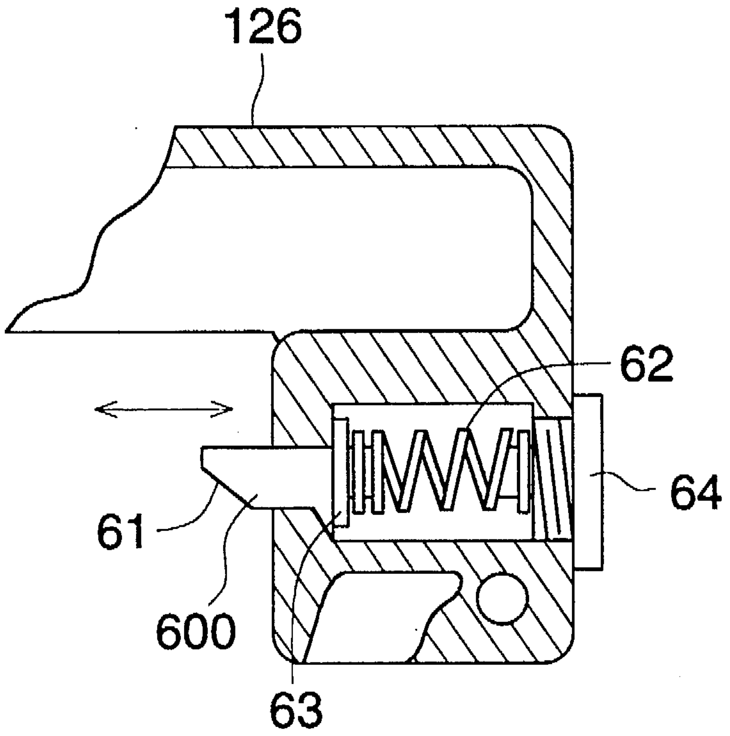
FIG. 5 is a view of the composition showing a portion of the cover member of the first embodiment of the present invention.

In FIG. 4, the toner replenishment device 40 and the release prevention mechanism of the cover member will be described below. For the purpose of explanation, the cover member 126 shown in FIG. 3 will be explained as a representative structure. As shown in the drawing, the mount 120, to which the toner cartridge 50 is attached, is closed by the cover member 126. An engagement claw portion 600, which has an inclined surface 61 on the side opposed to the engagement portion 124, is provided inside the cover member 126. As shown in FIG. 5, the engagement claw portion 600 is forced outward by an elastic member such as a spring or the like, and is held at a predetermined position by a collar portion 63, which is integrally formed with the engagement claw portion 600, using a screw member 64 which can be screwed and unscrewed. In this structure, the elevation lever 204 is elevated by the cam 212, the rotational member 200 is moved around the shaft 208 to a position shown in FIG. 3. That is, as shown in FIG. 4, the engagement portion 124 of the rotational member 200 is moved to a position at which the engagement claw portion 600 is engaged with the engagement portion 124. Accordingly, the cover member 126 can not be opened in the arrowed direction. In FIG. 3, elevation levers 205 and 207 are elevated by cams 213 and 215. Rotational members 201 and 203 are moved around shafts 209 and 211 to the position shown in FIG. 3. Engagement claw portions 601 and 603 of cover members 1261 and 1263 are engaged with engagement portions 1241 and 1243. Accordingly, cover members 1261 and 1263 can not be opened in the same way as in the explanation in FIG. 4.

Next, the cover member, which can be opened, will be described below. Initially, in FIG. 3, the cam 214 and the moving lever 217 are moved by the solenoid 218. A pin 2061 can be lowered with respect to the cam 2173, and the elevation lever 206 is lowered. Accordingly, the rotational member 202 is rotated counterclockwise around the shaft 210, and the engagement portion 1242 is rotated to a position separated from the position at which the engagement claw portion 602 of the cover member 1262 is provided.

Figure 6:
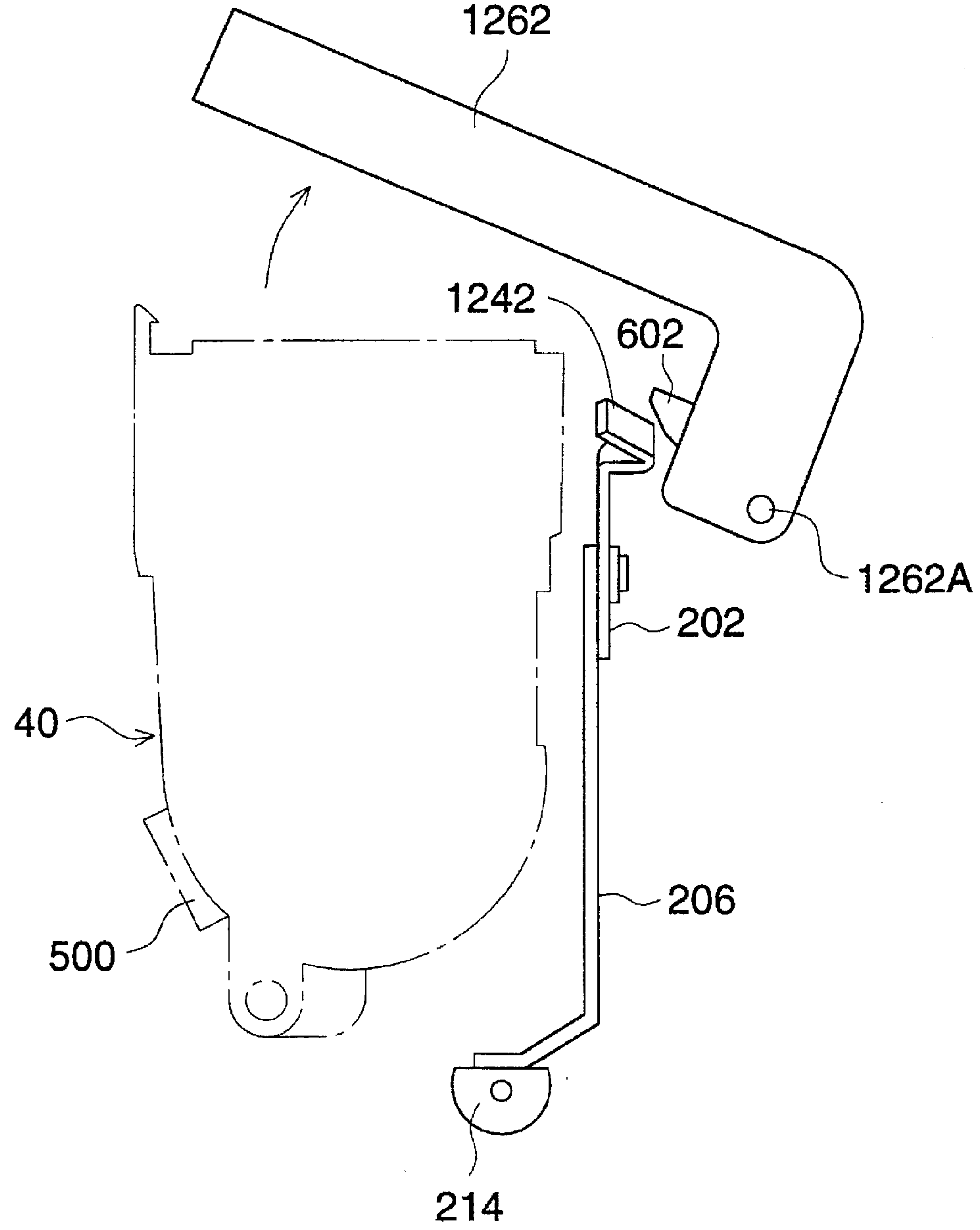
FIG. 6 is a view of the composition showing a condition in which the cover member in FIG. 4 is opened.

FIG. 6 is a side view showing a condition in which the engagement portion 1242 is separated from the position at which the engagement claw portion 602 of the cover member 1262 is provided. Since the engagement claw portion 602 is disengaged from the engagement portion 1242, the cover member 1262 can be rotated around a support shaft 1262A and opened from the upper portion of the toner replenishment device. Accordingly, the toner cartridge 50 can be attached to a portion corresponding to cyan (C) shown in FIG. 2.

Figure 7:
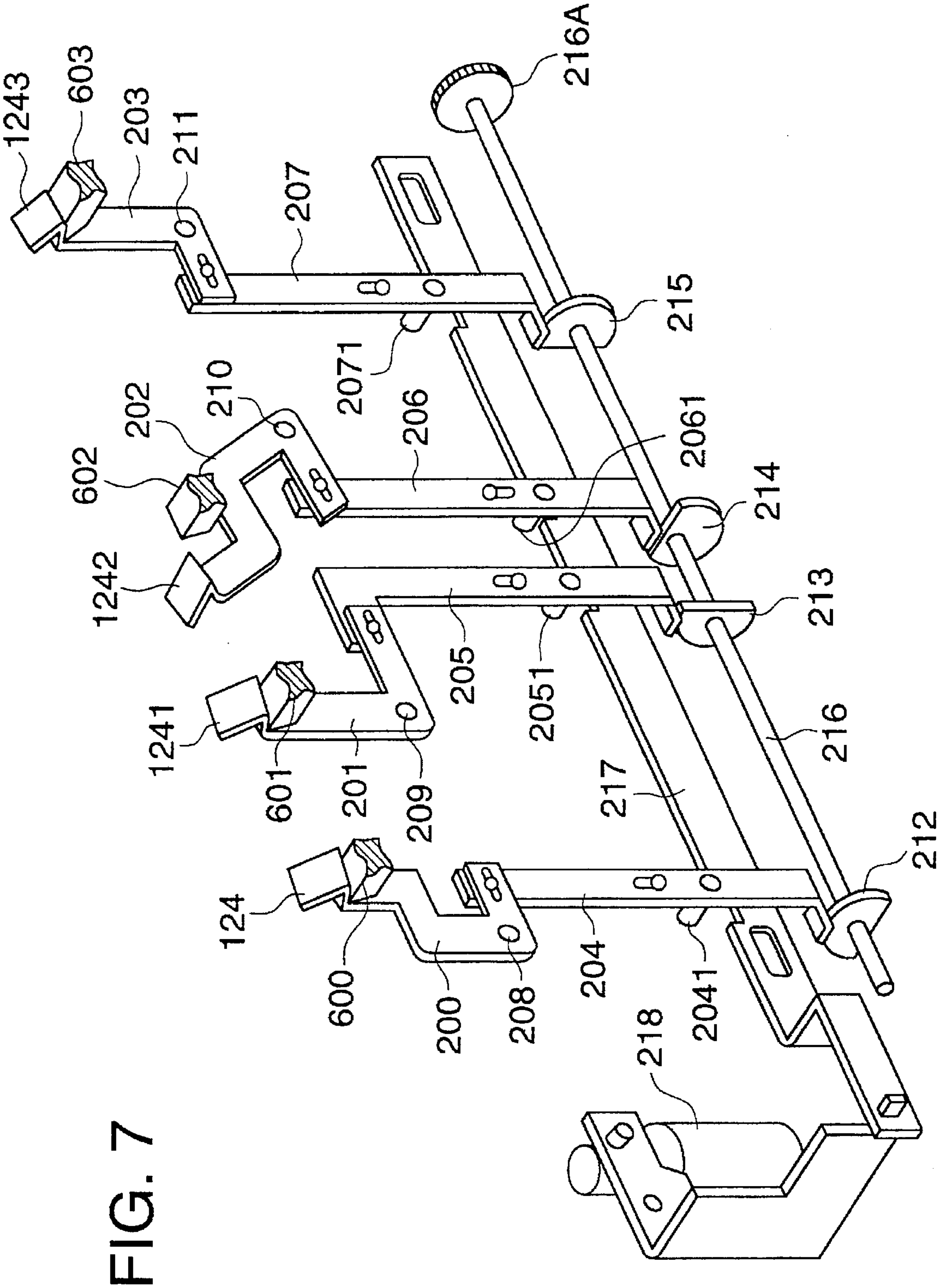
FIG. 7 is a perspective view showing an opening prevention mechanism of the cover member in FIG. 3.

FIG. 7 is a perspective view showing a condition in which engagement claw portions 600, 601, 602, and 603 of cover members 126, 1261, 1262 and 1263 are engaged with rotational members 200, 201, 202 and 203.

Figure 8:
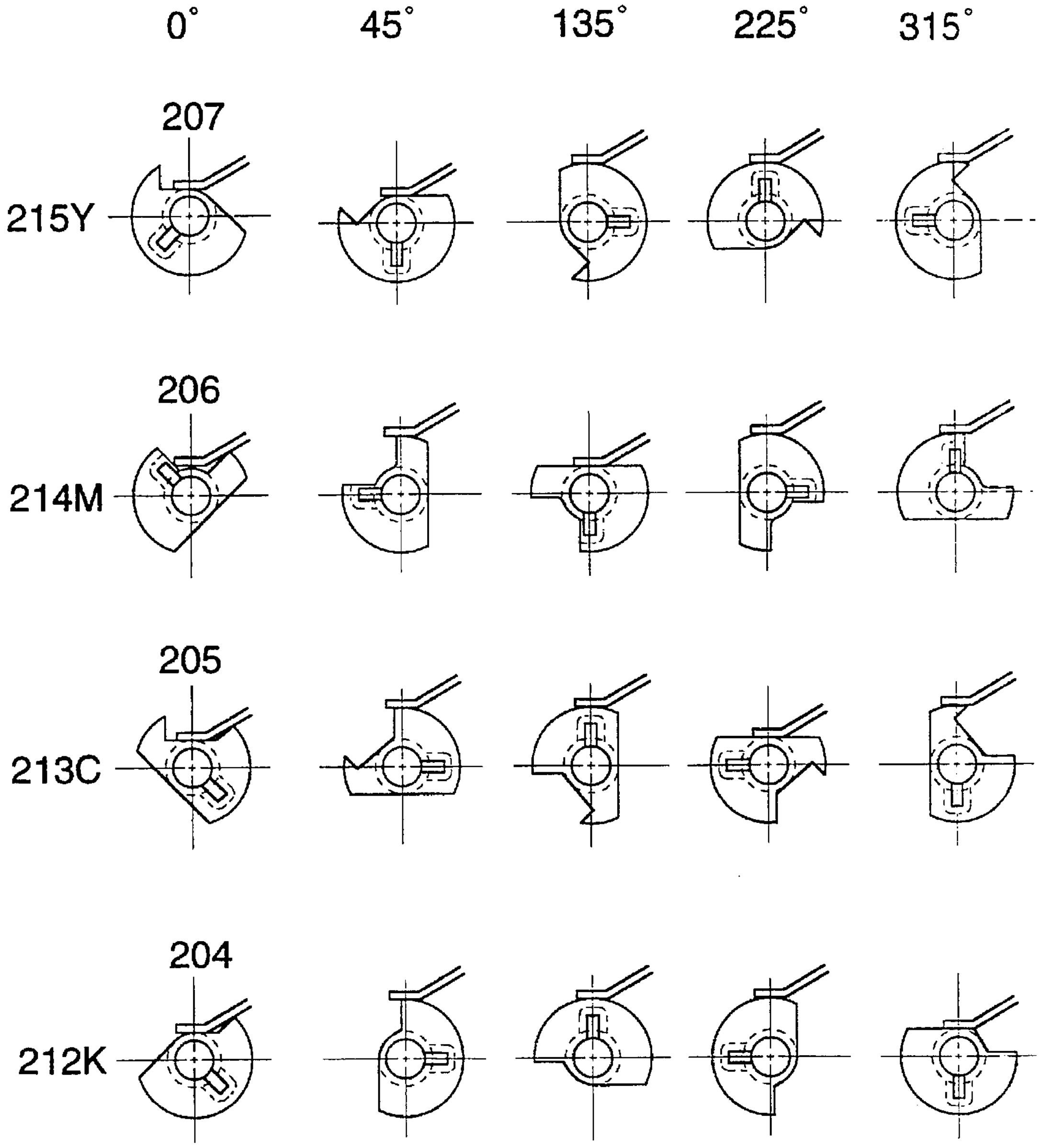
FIG. 8 is an illustrative view showing a cam rotational phase position in the first and the second embodiments of the present invention.

FIG. 8 is a view showing angles of rotation of cams 212, 213, 214 and 215. Opening and prevention operations of cover members of 126, 1261, 1262 and 1263 will be described below.

Cams are respectively fixed to the shaft 216, keeping a vertical phase relationship shown in the drawing. Cams can simultaneously change phases ranging from 0° to 315° depending on the rotation angle of the shaft 216. That is, when the shaft 216 is positioned at an angle of 0°, each of elevation levers 204, 205, 206 and 207 is in an unconstrained condition, and is lowered by its own weight. That is, the moving lever 217 is moved right, and grooved cams 2171, 2172, 2173 and 2174 are respectively opposed to pins 2041, 2051, 2061 and 2071 of elevation levers 204, 205,206 and 207 so that the moving lever 217 can be moved.

The shaft rotation angle of 0° is used when the image forming apparatus 100 is newly installed and toner is supplied to all of the toner replenishment devices 40. Cams 212, 213 and 214 respectively push up elevation levers 204, 205 and 206 in a position in which cams 212, 213, 214 and 215 of the shaft 216 are rotated 45° counterclockwise. Engagement claw portions 600, 601 and 602 are prevented from moving by engagement portions 124, 1241 and 1242 of rotational members 200, 201 and 202. Accordingly, only the cover member 1263 for the yellow (Y) toner accommodating portion can be opened, and the toner cartridge 50 can be attached to the replenishment position. Each of the magenta (M), cyan (C) and black (K) toner cartridges 50 can be attached for replenishment at the position in which cams 212, 213, 214 and 215 of the shaft 216 are sequentially rotated 135°, 225° and 315°. In FIGS. 3 and 7, the cover member 1262 can be opened when cams 212, 213,214 and 215 are rotated 135°.

The rotation angles of cams 212, 213, 214 and 215 are controlled as follows. Detection members 500 shown in FIG. 4 are respectively provided in toner accommodating portions 40A, 40B, 40C and 40D, and respectively detect the remaining amounts of yellow (Y), magenta (M), cyan (C) and black (K). Detection member 500 respectively detect an insufficient toner amount in any of the toner accommodating portions 40A, 40B, 40C and 40D. The detection signal is sent to, for example, a CPU. The rotation angle of the cam is controlled when a gear 216A, provided on the shaft 216, is rotated by an encoder (not shown in the drawing) connected to a stepping motor which is controlled by the CPU. The cam rotation angle is then selected and toner can be replenished.

Next, the toner replenishment device 40, for replenishing toner to a plurality of developing units, according to the 2nd embodiment of the present invention, will be described in detail in FIG. 9.

Figure 9:
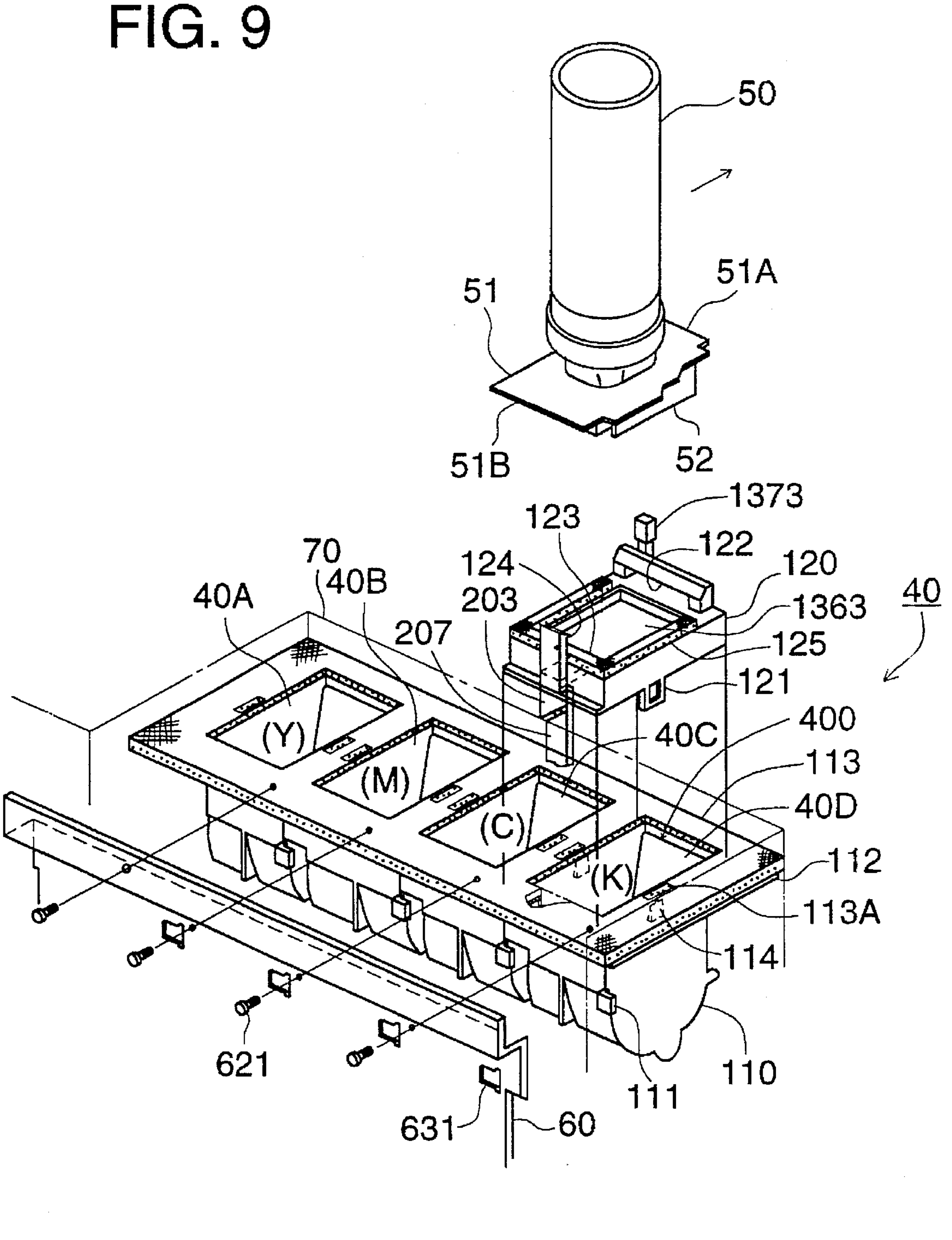
FIG. 9 is an exploded perspective view showing the composition of the second embodiment of the toner replenishment device of the present invention.

The toner replenishment device 40 shown in FIG. 9 is composed of: toner accommodating portions 40A, 40B, 40C and 40D for accommodating respectively yellow (Y), magenta (M), cyan (C) and black (K) toners for use in developing units 14A, 14B, 14C and 14D; and a plurality of mounts 120 onto which toner cartridges 50, disclosed in Japanese Patent Publication Open to Public inspection No. 18876/1993, are attached.

The toner replenishment device 40 is fixed to and integrated with a mounting plate 60 in such a manner that a protrusion 111 provided on the outer side surface of a toner hopper 110, formed in the toner replenishment device 40, is engaged with a hole 631 of the mounting plate 60 supported by the apparatus main body, and the device is fixed by a screw 621.

A flange 112 is formed on the upper portion of each toner replenishment device 40, and a seal material 113 is adhered onto the flange 112. The flange 112 is integrally attached to the inner surface of a wall 70 of the apparatus and the mounting plate 60.

The seal material 113 is made of soft elastic material such as urethane form. The mounts 120 are attached to toner supply openings 400 respectively formed on the toner accommodating portions 40A, 40B, 40C and 40D in which toners are accommodated, in the toner replenishment device 40. The mounts 120 are attached by the following method. An engagement means 121 provided on the mount 120 is thrust into the seal material 113 and the flange 112 through a slit 113A, and the mount 120 is integrated with the flange 112 when the engagement means 121 is engaged with the engagement portion 114 of the toner hopper 110. When the mount 120 is attached to the toner replenishment device 40, leakage of toner is prevented in such a manner that the seal material 113 is pressed and sandwiched between the mount 120 and the flange 112. In the mount 120, the cover member (hereinafter, called partition member) 1363 is provided in such a manner that it can slide outward, and normally, it is structured so as to close the toner supply opening 400. A knob 1373 is provided on one end of the partition member 1363. An elevation lever 207 to prevent the partition member 1363 from moving, and an engagement member 203 are provided on the mount 120.

An end portion 51A of the base plate 51 provided on one end of the toner cartridge 50, and a sleeve portion 52 can be respectively engaged with an insertion portion 122 and a frame portion 123 of the mount 120. The other end portion 51B of the base plate 51 is engaged with an engagement portion 124 provided on the side of the mount 120, and the base plate 51 is supported on the mount 120 in such a manner that the end portion 51B is pressed and sandwiched between the engagement portion 124 and the mount 120 through a seal member 125.

Figure 10:
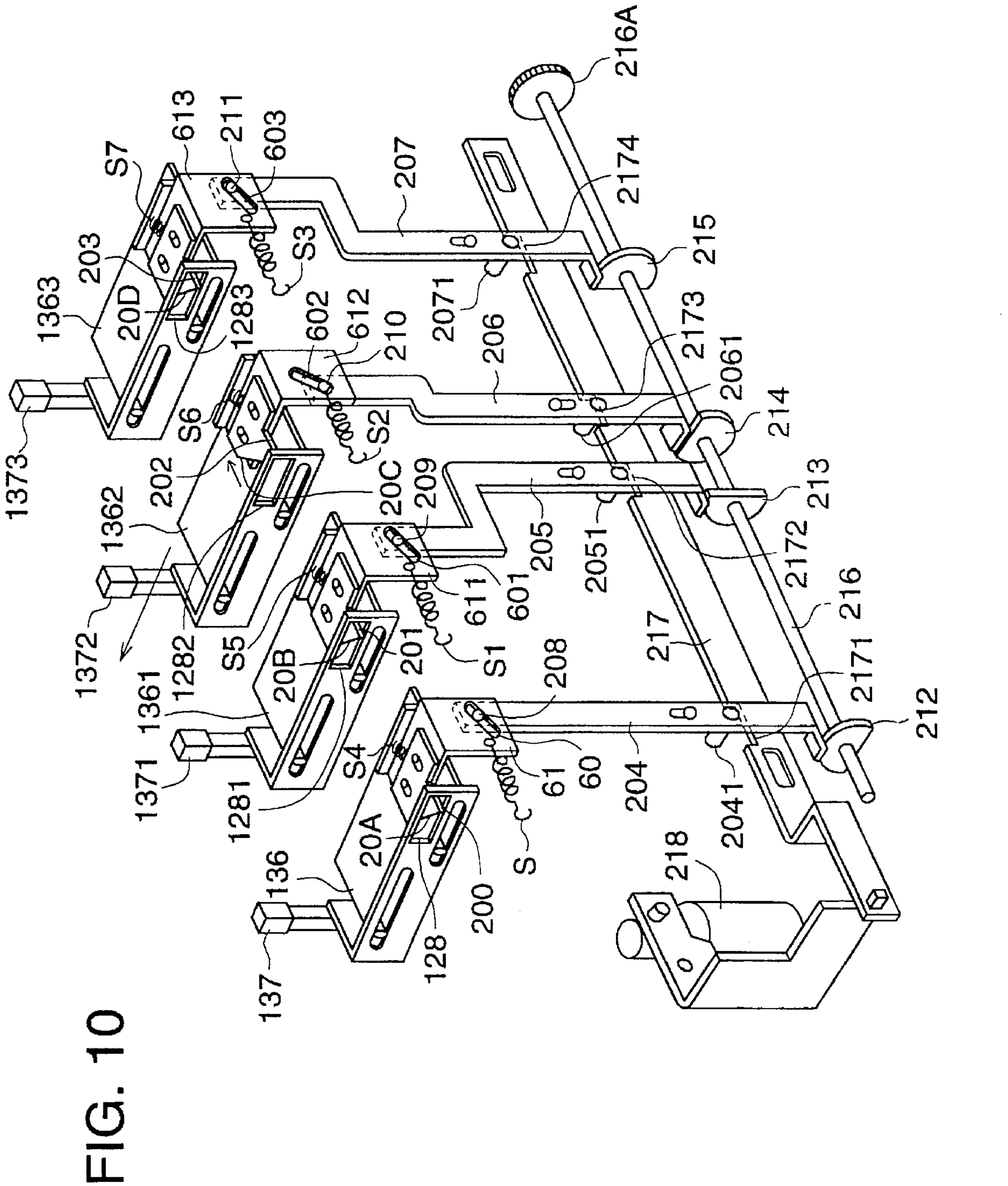
FIG. 10 is a perspective view showing an opening prevention mechanism of a partition member in the second embodiment of the toner replenishment device of the present invention.

FIG. 10 shows a mechanism for enabling the partition member 136 to be slid or not slid. This mechanism enables both the partition member 136 and the slide cover of the toner cartridge 50 corresponding to only the accommodating portion for which toner replenishment is necessary, to be operated, in accommodating portions 40A, 40B, 40C and 40D in which yellow (Y), magenta (M), cyan (C) and black (K) toners are respectively accommodated, and the mechanism causes partition members 136 and the slide covers corresponding to all accommodating portions, for which no replenishment is necessary, not to be operated.

Partition members 136 are respectively provided in mounts 120 which are respectively provided on accommodating portions 40A, 40B, 40C and 40D in which above-described toners are accommodated, as partition members 136, 1361, 1362 and 1363. Engagement release mechanisms for releasing engagement of the partition members 136, 1361, 1362 and 1363 are provided. The engagement release mechanism will be described below. Engagement members 200, 201, 202 and 203, one side of each of which is tapered, are provided on operation plates 61, 611, 612 and 613, in which inclination cams 60, 601, 602 and 603 are formed, so that the engagement members can slide. Engagement members are respectively forced in one direction by springs $S_4$, $S_5$, $S_6$ and $S_7$ provided between engagement members and operation plates 61, 611, 612 and 613. Pins 208, 209, 210 and 211, provided respectively on elevation levers 204, 205, 206 and 207, are engaged with the inclination cams 60, 601, 602 and 603. Engaged members 128, 1281, 1282 and 1283, with which engagement members 200, 201, 202 and 203 are respectively engaged, are respectively fixed to partition members 136, 1361, 1362 and 1363. Knobs 137, 1371, 1372 and 1373 which are respectively operated together with engaged members 128, 1281, 1282 and 1283 and partition members 136, 1361, 1362 and 1363, are provided respectively on the partition members. Springs S, $S_1$, $S_2$ and $S_3$ are respectively provided on operation plates 61, 611, 612 and 613 in such a manner that engagement members 200, 201, 202 and 203 are forced in the direction of engagement.

Cams 212, 213, 214 and 215, which are in contact with lower end portions of elevation levers 204, 205, 206 and 207, provided in such a manner that the levers can be slid with respect to the image forming apparatus 100, are respectively fixed to the shaft 216. A moving lever 217, in which grooved cams 2171, 2172, 2173 and 2174 are formed, is provided behind elevation levers 204, 205, 206 and 207. While the image forming apparatus 100 is operated, when the moving lever 217 is moved to the left in FIG. 10 by the ON-operation of a solenoid 218, elevation levers 204, 205, 206 and 207 are prevented from being lowered by pins 2041, 2051, 2061 and 2071 respectively provided on elevation levers 204, 205, 206 and 207.

Figure 11:
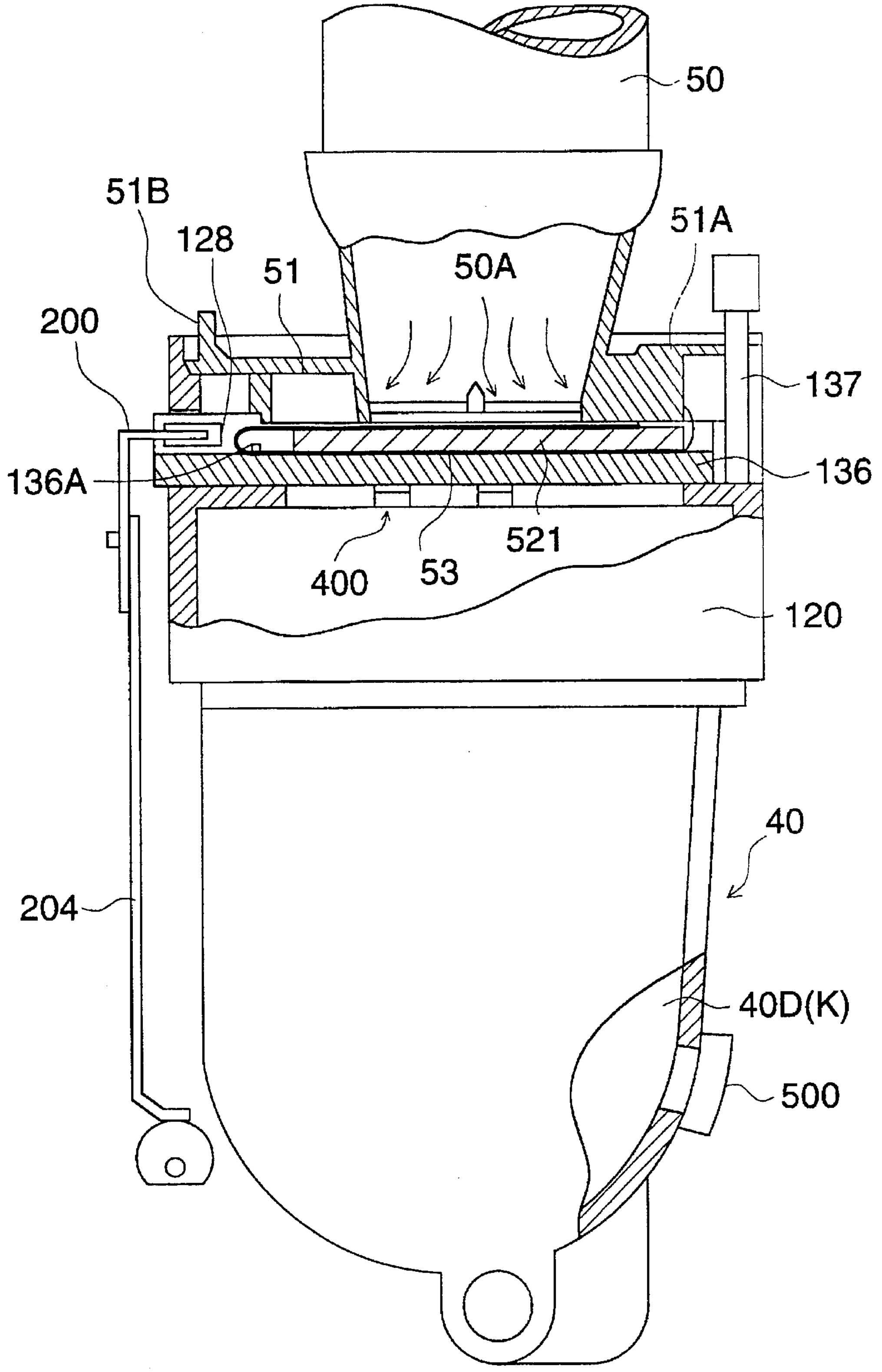
FIG. 11 is a view of the composition showing a condition in which the partition member is closed in the second embodiment of the toner replenishment of the present invention.

Next, in FIG. 11, the toner replenishment device 40 and a prevention mechanism of the partition member 136 will be explained below. For explanation, the partition member 136 in FIG. 10 will be explained as a representative structure. As shown in FIG. 11, the partition member 136 is attached in a frame portion 123 of the mount 120 onto which the toner cartridge 50 is attached. In this structure, the elevation lever 204 is elevated by the cam 212. The engagement member 200 is engaged with the engaged member 128 by the pin 208 and the inclination cam 60, and the partition member 136 can not be moved outward by the knob 137. Accordingly, since the partition member 136 is prevented from moving, a protrusion 136A provided on the partition member 136 does not collide with a slide cover 521, both ends of which are fixed to the toner replenishment opening portion of the toner cartridge 50, and which is provided in a sealed film 53, and the protrusion 1362A and the slide cover 521 are prevented from moving. Elevation levers 205 and 207 are also elevated by other cams 213 and 215. Engagement members 201 and 203 are engaged with the engaged members 1281 and 2183, and all movement is prevented. As shown in FIG. 11, for example, even when the toner cartridge 50 is attached in the frame portion 123 of the mount 120, the partition members 1361 and 1363 can not be moved outward. Accordingly, the slide cover 521 of the toner cartridge 50 is not moved together with the partition members 136, 1361 and 1363, so that toner can not be replenished.

Figure 12:
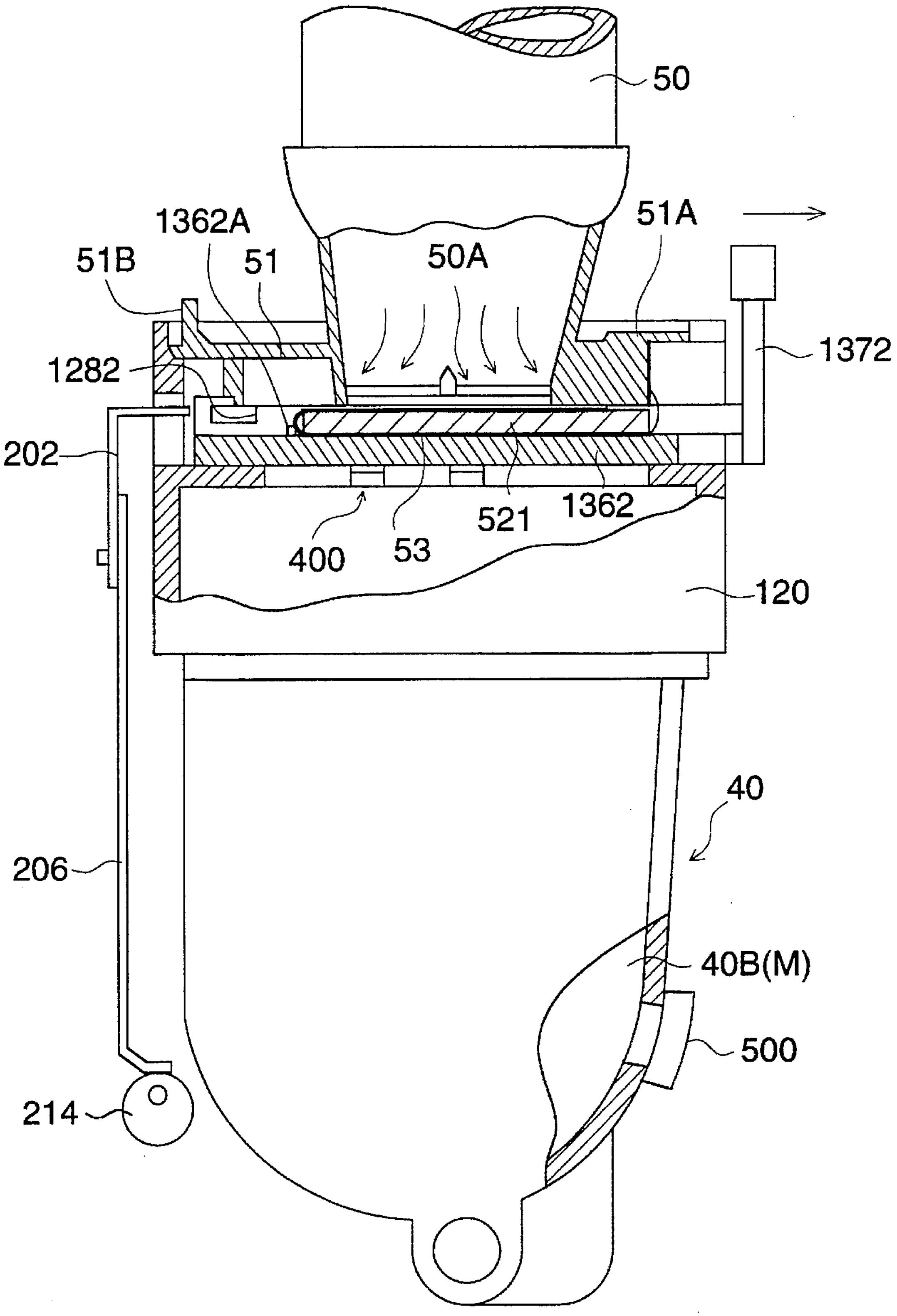
FIG. 12 is a view of the composition showing a condition in which the partition member is opened in the second embodiment of the toner replenishment device of the present invention.

Next, the partition member in which the prevention condition is negated, and which is opened, will be explained below. In this example, in FIG. 10, when the solenoid 218 is inactivated, the moving lever 217 moves to the right. A pin 2061 can be lowered at the cam 2173 and also at the cam 214, and the elevation lever 206 is lowered. Accordingly, the pin 210 of the elevation lever 206 is lowered, and the engagement member 202 is moved in the arrowed direction against the spring force of the spring $S_2$ by the lowering action of the pin 210 and the action of the inclination cam 602. That is, since the prevention condition is released from the engaged member 1282, only the partition member 1362 can slide outward, and can be moved in the arrowed direction by the knob 1372. As shown in FIG. 12, the protrusion 1362A provided on the partition member 1362 comes into contact with one end of the slide cover 521, both ends of which are fixed to the toner replenishment opening 50A of the toner cartridge 50, and which is provided in the sealed film 53. As described above, the partition member 1362 is moved in the arrowed direction together with the slide cover 521 of the toner cartridge 50 by the knob 1372. The sealed film 53 is successively peeled off from the toner replenishment opening 50A when the slide cover 521 is moved, and toner is replenished into the toner accommodating portion, for example, 40B in which magenta (M) toner is accommodated.

As described above, after the toner replenishment from the toner cartridge 50 has been completed, the knob 1372 is pushed and the partition member 1362 is returned to its original position. At this time, although the outer side surface of the engaged member 1282 comes into contact with the other side of the engagement member 202, the engagement member 202 is moved backward against the force of the spring $S_6$ by the tapered portion 20C, and the partition member 1362 can return smoothly to its original position. Then, the engagement member 202 returns to its original position by the force of the spring $S_6$ and stops at the engagement position of the engaged portion 1282.

The opening and preventing operations of the partition members 136, 1361, 1362 and 1363 are basically the same as those of the cover members 126, 1261, 1262 and 1263 in the first example, and therefore, explanation of these operations will be omitted.

As explained above, in the present invention, when yellow (Y), magenta (M), cyan (C) and black (K) toners are sufficiently replenished into toner accommodating portions 40A, 40B, 40C and 40D in which toners are accommodated, or when no replenishment of toner is needed, the cover member 126 is prevented from opening so that the toner cartridge 50 can not be set onto the toner accommodating portions, or the partition member 136 is prevented from moving so that toner can not be replenished. However, for only the toner accommodating portion in which an insufficient amount of toner is detected by the detection member 500, in the toner accommodating portions 40A, 40B, 40C and 40D, the cover member 126 can be opened, or the partition member 136 of the toner replenishment device and the slide cover 521 of the toner cartridge 50 can be moved. As a result, excess toner does not overflow, toner does not contaminate the inside of the apparatus, and further, faults of the toner replenishment apparatus due to overflowing of toner can also be prevented.

What is claimed is:

1. An image forming apparatus including a developing device provided at a peripheral surface of an image carrier, and a toner replenishment device for replenishing a toner to said developing device, said apparatus further comprising:

a) detecting means provided in said toner replenishment device, for detecting a remaining amount of toner in said toner replenishment device;

b) a toner cartridge for storing a toner therein and for supplying the toner to said toner replenishment device, and said toner cartridge being detachably attachable to a toner replenishment opening of said toner replenishment device;

c) a slide cover provided on said toner cartridge so as to be opened and closed; and d) a cover opening prevention member provided on said toner replenishment opening for preventing said slide cover from being opened, wherein only when said detecting means detects that the remaining amount of toner reaches a predetermined amount or less, said slide cover can be opened so that the toner stored in the toner cartridge is supplied to said toner replenishment device through said toner replenishment opening, and wherein when said cover opening prevention member is released, said slide cover can be opened.

2. The image forming apparatus of claim 1, wherein:

said developing device includes a plurality of developing devices;

said toner replenishment device includes a plurality of replenishment devices for replenishing different toners to respective ones of said plurality of developing devices through a plurality of toner replenishment openings respectively formed on said plurality of replenishment devices;

said detecting means includes a plurality of detecting means respectively provided in said plurality of replenishment devices;

said toner cartridge includes a plurality of toner cartridges for storing respectively different toners and for respectively supplying said toner to said plurality of replenishment devices;

said slide cover includes a plurality of slide covers respectively provided on said plurality of toner cartridges; and wherein only when one of said plurality of detecting means detects that a remaining amount of toner in the replenishment device corresponding to said detecting means reaches said predetermined amount or less, only the slide cover of the toner cartridge corresponding to said detecting means can be opened, so that the toner stored in the corresponding toner cartridge can be supplied to the corresponding replenishment device through the respective toner replenishment opening to the corresponding replenishment device.

3. The image forming apparatus of claim 2, further comprising:

a plurality of cover opening prevention members provided respectively on said plurality of toner replenishment openings for preventing respectively said plurality of slide covers from being opened, and wherein when one of said plurality of cover opening prevention members are released respectively, said plurality of slide covers can be opened respectively.

4. The image forming apparatus of claim 2, further comprising:

a plurality of partition members provided respectively on said plurality of toner replenishment openings of said replenishment devices, said partition members being capable of being opened and closed; and a plurality of cover opening prevention members provided respectively on said toner replenishment openings for preventing said plurality of slide covers from being opened respectively, and wherein only when one of said plurality of detecting means detects that the remaining amount of toner in the replenishment device corresponding to said detecting means reaches said predetermined amount or less, the cover opening prevention member corresponding to said detecting means is released, and thereby the corresponding slide cover and the corresponding partition member can be simultaneously opened so that the toner stored in the corresponding toner cartridge can be supplied to the corresponding replenishment device through the corresponding toner replenishment opening.

5. The image forming apparatus of claim 4, further comprising:

control means for selecting only the replenishment device in which the corresponding detecting means detects that the remaining amount of toner reaches said predetermined amount, and for controlling the selected replenishment device so that the corresponding cover opening prevention member is released, and thereby the corresponding slide cover and the corresponding partition member in said selected replenishment device can be simultaneously opened.

6. The image forming apparatus of claim 5, wherein:

said plurality of cover opening prevention members each comprises a sliding member for engagement, an elevation lever, and a cam member; and the cam member the sliding member, and the elevation member are linked with each other such that said cover opening prevention member conducts engagement and disengagement of said partition members.

7. The image forming apparatus of claim 1, further comprising:

a partition member provided at said toner replenishment opening, said partition member capable of being opened and closed, and wherein only when said detecting means detects that the remaining amount of toner reaches said predetermined amount or less, said slide cover and said partition member can be simultaneously opened so that the toner stored in the toner cartridge is supplied to said toner replenishment device through said toner replenishment opening.

8. The image forming apparatus of claim 7, further comprising:

a cover opening prevention member provided on said toner replenishment opening for preventing said slide cover from being opened, and wherein only when said slide cover opening prevention member is released, said slide cover can be opened.

9. An image forming apparatus including a developing device provided at a peripheral surface of an image carrier, and a toner replenishment device for replenishing a toner to said developing device, said apparatus further comprising:

(a) detecting means provided in said toner replenishment device, for detecting a remaining amount of toner in said toner replenishment device;

(b) a cover provided on a toner replenishment opening of said toner replenishment device so as to be opened and closed; and (c) engagement means provided on said toner replenishment device, for being engaged with said cover, said engagement means comprising:

(1) a rotation member, (2) an elevation lever, and (3) a cam member, and wherein said cover is engaged with and disengaged from said engagement means when the cam, a part of an operation member, and the elevation lever are linked with each other, and wherein when said detecting means detects that the remaining amount of toner reaches a predetermined amount or less, said engagement means releases said cover to permit said cover to be opened.

10. The image forming apparatus of claim 9, wherein said engagement means releases said cover only when the remaining amount of toner is detected to reach said predetermined amount or less.

11. An image forming apparatus including a developing device provided at a peripheral surface of an image carrier, and a toner replenishment device for replenishing a toner to said developing device, said apparatus further comprising:

(a) detecting means provided in said toner replenishment device, for detecting a remaining amount of toner in said toner replenishment device;

(b) a cover provided on a toner replenishment opening of said toner replenishment device so as to be opened and closed; and said developing device includes a plurality of developing devices;

said toner replenishment device includes a plurality of replenishment devices connected respectively with the plurality of developing devices for replenishing different toners to respective ones of said plurality of developing devices through a plurality of toner replenishment openings provided respectively on said plurality of replenishment devices;

said detecting means includes a plurality of detecting means provided respectively in said plurality of replenishment devices;

a plurality of toner cartridges for storing respectively different toners and for respectively supplying said toners to said plurality of replenishment devices;

a plurality of slide covers provided respectively on said plurality of toner cartridges;

engagement means on each of said replenishment devices for being engaged with a slide cover of a toner cartridge; and control means for selecting only a replenishment device in which a corresponding detecting means detects that the remaining amount of toner reaches said predetermined amount or less, and for controlling the selected replenishment device so that the engagement means of a corresponding slide cover is released such that the corresponding slide cover of said selected replenishment device is enabled to be opened.

12. The image forming apparatus of claim 11, further comprising:

a plurality of partition members provided respectively on said plurality of toner replenishment openings of said replenishment devices, said partition members being capable of being opened and closed; and said partition members being engageable by said engagement means of a corresponding replenishment device and being disengageable from said engagement means when said control means releases said engagement means of the selected replenishment device to enable said cover and said partition member of the selected replenishment device to be simultaneously openable.

13. An image forming apparatus including a developing device provided at a peripheral surface of an image carrier, and a toner replenishment device for replenishing a toner to said developing device, said apparatus further comprising:

(a) detecting means provided in said toner replenishment device, for detecting a remaining amount of toner in said toner replenishment device;

(b) a toner cartridge for storing a toner therein and for supplying the toner to said toner replenishment device, and said toner cartridge being detachably attachable to a toner replenishment opening of said toner replenishment device;

(c) a slide cover provided on said toner cartridge so as to be opened and closed; and (d) a cover opening prevention member for preventing said slide cover from being opened, wherein only when said detecting means detects that the remaining amount of toner reaches a predetermined amount or less, said slide cover can be opened so that the toner stored in the toner cartridge is supplied to said toner replenishment device through said toner replenishment opening, and wherein when said cover opening prevention member is released, said slide cover can be opened.

* * * * *